United States Patent
Kleinschmidt et al.

[11] 3,866,001
[45] Feb. 11, 1975

[54] STRUCTURAL BLOCK WITH SEPTUM

[75] Inventors: Klaus Kleinschmidt, Lexington, Mass.; David Proudfoot, Honolulu, Hawaii

[73] Assignee: Miguel C. Junger, Belmont, Mass.

[22] Filed: Mar. 4, 1974

[21] Appl. No.: 447,568

[52] U.S. Cl.............................. 181/33 G, 52/145
[51] Int. Cl.............................................. E04b 1/84
[58] Field of Search............ 181/33 R, 33 G, 48, 59; 52/144, 145

[56] References Cited
UNITED STATES PATENTS

| | | | |
|---|---|---|---|
| 2,007,130 | 7/1935 | Munroe et al. | 181/33 G UX |
| 2,933,146 | 4/1960 | Zaldastani et al. | 181/33 G UX |
| 3,037,578 | 6/1962 | Jack | 181/33 R |
| 3,183,996 | 5/1965 | Capaul | 181/33 G UX |
| 3,265,154 | 8/1966 | March | 181/33 G UX |
| 3,275,101 | 9/1966 | Morrissey et al. | 181/33 G UX |
| 3,307,651 | 3/1967 | Podgurski | 181/33 G UX |
| 3,506,089 | 4/1970 | Junger | 181/33 G UX |

*Primary Examiner*—Richard B. Wilkinson
*Assistant Examiner*—John F. Gonzales
*Attorney, Agent, or Firm*—Kenway & Jenney

[57] ABSTRACT

A sound absorbing structural block having a cavity with an aperture facing the sound source. A frequency filtering septum divides the cavity into two volumes, thereby achieving a secondary absorption peak at a frequency higher than the fundamental resonant frequency of the cavity. In one form, a sound absorbing fibrous filler material is laminated to the septum. In another form, multiple septa are used to achieve plural secondary absorption peaks.

9 Claims, 5 Drawing Figures

PATENTED FEB 11 1975 3,866,001

STRUCTURAL BLOCK WITH SEPTUM

BACKGROUND OF THE INVENTION

This invention relates generally to a structural block having sound absorbing properties, and more particularly to a sound absorbing block of a molded structural material such as concrete of the type disclosed in U.S. Pat. No. 2,933,146, issued Apr. 19, 1960 to Zaldastani and Junger. This block is characterized by one or more cavities that communicate with a source of impinging noise through one or more slots in the wall of the block facing the noise source. Sound energy is dissipated by a Helmholtz resonance effect and by a "black body" effect resulting from multiple reflections within each cavity.

The acoustical impedance that each cavity presents to the incoming noise, and thus its effectiveness as a sound absorber, is dependent on the frequency of the impinging sound. The impedance is resistive and small (close to that of air), and the absorption is at a peak, when the frequency is near the natural or Helmholtz resonance frequency. In practice this absorption peak typically occurs in the frequency range usually associated with machine noise (100 to 300 Hz, approximately). Frequently, however, it is more important to have a peak absorption at frequencies above this range, such as those associated with speech.

U.S. Pat. No. 3,506,089, issued Apr. 14, 1970 to Junger discloses a sound absorbing block utilizing a slot having outwardly flaring walls that decrease the cavity impedance, and therefore increase absorption, at frequencies above the Helmholtz resonance. This arrangement shifts the Helmholtz resonance to a higher frequency, usually one that is approximately 20 percent higher than the original resonance frequency. Although this shift is significant, it generally has only a minor effect at frequencies more than 100 Hz above the Helmholtz resonance. In particular, sound absorbing blocks of this type do not produce secondary absorption peaks at frequencies other than the Helmholtz resonance.

It is therefore a principal object of this invention to provide an improved sound absorbing block capable of greater sound absorption at frequencies above the fundamental Helmholtz resonance through the creation of at least one secondary absorption peak at frequencies above the fundamental Helmholtz resonance.

Another object of this invention is to provide a sound absorbing block that can be easily manufactured or adjusted to provide a secondary resonance at a preselected frequency.

Still another object of this invention is to provide a sound absorbing block that has plural secondary absorption peaks, each tuned to a separate, preselected frequency above the fundamental Helmholtz resonance.

Yet another object of this invention is to provide a sound absorbing block that employs a fibrous filler material in a manner that both heightens and broadens the characteristic sound absorption peaks of the block.

SUMMARY OF THE INVENTION

The sound absorbing structural block of this invention has a septum that divides an enclosed cavity into a front volume and a back volume. The front volume communicates directly with a slot or slots that extend from the cavity to an exterior surface of the block facing the sound to be suppressed. The back volume is effectively sealed from the slot. The septum acts as a mechanical low pass filter, reflecting high frequency sound so that it is absorbed principally in the front volume, and transmitting low frequency sound to the back volume so that it is absorbed in both volumes. The reduced cavity volume effective in relation to the impinging high frequency sound results in a secondary absorption peak at a frequency above the Helmholtz resonance. Through a proper selection of the location of the septum, and hence the size of the front volume, it is possible to select accurately the frequency of the secondary peak. In one form, multiple septa are used in a single cavity to create a number of secondary resonances, each at a preselected frequency. In another form, a fibrous filler material is used in conjunction with the septum to heighten and broaden all of the characteristic absorption peaks of the block.

BRIEF DESCRIPTION OF THE PREFERRED EMBODIMENTS

DETAILED DESCRIPTION OF THE PREFERRED EMBODIMENTS

Figure 1:
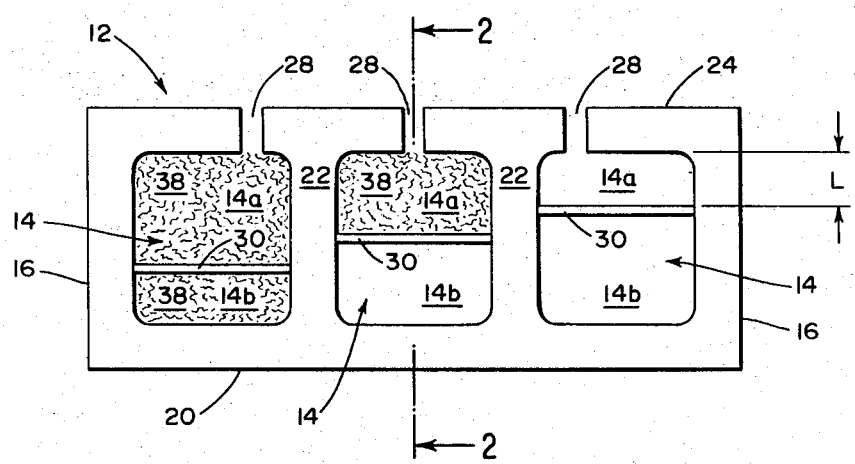
FIG. 1 is a bottom view of a masonry block embodying the invention.
Figure 2:
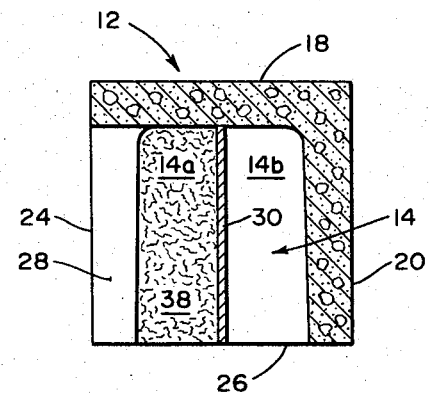
FIG. 2 is an elevation in section taken on the line 2—2 of FIG. 1.

A masonry block 12 according to a first embodiment of this invention is shown in FIGS. 1 and 2. The block is manufactured in a conventional manner by means of a block mold adapted to pack a hardenable aggregate around each of three tapered male plugs having a shape corresponding to that of a cavity 14. The masonry material can be any hardenable type such as concrete or the like. When the material hardens sufficiently, as by drying or heating, the mold elements are stripped. After curing, the block hardens into a load bearing structural element.

The block has a pair of closed end walls 16, a third or top closed wall 18 contiguous with the walls 16, a fourth or back closed wall 20 contiguous with the walls 16 and 18, closed partition walls 22 and a fifth or front wall 24 opposite the fourth wall and intended to face the source of sound to be suppressed. A bottom plane 26, opposite the wall 18, is open to the cavities 14. It should be noted, however, that this opening is sealed by a top wall 18 of another block and a layer of mortar when the blocks 12 are laid up in courses to form strutures such as walls or ceilings.

The wall 24 has apertures in the form of parallel sided slots 28 providing communication between each of the cavities 14 and the air propagating the sound to be suppressed. The combination of the cavity and the slot form an acoustical Helmholtz resonator. The slot extends in length from the bottom plane 26 to the interior surface of the top wall 18. The width of the slot 28 at the exterior surface of the wall 24, and throughout the depth of the slot, is shown substantially constant, but may be tapered in accordance with said U.S. Pat. No. 3,506,089 or a copending U.S. application Ser. No. 430,765, filed Jan. 4, 1974 by Klaus Kleinschmidt.

Sound energy impinging on the wall 24 is dissipated in part by multiple reflections within the cavities 14 (the "black body" effect) and in part by losses within the slots 28. These losses are largest at frequencies for which there is an acoustical resonance. This resonance phenomenon, associated with the Helmholtz resonance effect, occurs when the frequency of the impinging sound is close to or at the natural frequency of the slot and the cavity. In physical terms, resonance occurs when sound waves of maximum amplitude are oscillating and being frictionally dissipated within the slot.

With regard to the Helmholtz effect, the natural or resonant frequency of a Helmholtz resonator is inversely proportional to the square root of the mass of the air in and adjacent to the slot 28. The resonant frequency is also inversely proportional to the square root of the cavity volume. In the acoustical Helmholtz cavity the air mass in the slot 28 is analogous to the mass in a mechanical spring-mass system, and the volume of the cavity 14 is analogous to the spring.

A principal feature of this invention is a septum 30 that divides each cavity 14 into a front volume 14a and a back volume 14b. The front volume 14a communicates directly with the slot 28, and the back volume 14b is essentially isolated from the slot. High frequency sounds entering the cavity are, in substantial part, reflected from the septum and absorbed within the front volume. Low frequency sounds predominately pass through the septum and are absorbed within the entire cavity 14, which comprises both the front and back volumes.

The septum 30 is formed from a sheet of non-porous material such as aluminum foil, paperboard or steel that has a sufficient thickness, surface density, and stiffness to achieve the differential sound transmission described above. If the septum is too thin, it will transmit too much high frequency sound and therefore fail to act as an efficient high frequency barrier. If the septum is too thick, it will effectively shut off the back volume to all of the frequencies. Suitable septa have been formed from five mil (0.005 inch) aluminum foil and sheets of ten mil paperboard. However, even materials as dense as lead with thicknesses of up to 40 mils have exhibited the desired differential transmission qualities. In general, it has been found that the septum must have a minimum surface density of approximately 0.05 pounds per square foot.

In addition to meeting certain porosity and density requirements, the septum must also be substantially sealed to the interior surface of the cavity 14. If there are any significant gaps, an unacceptable amount of high frequency sound passes around the septum. Although an adhesive bond or caulked joint between the cavity surface and the edge of the septum is desirable, a simple friction fit achieves good results. In addition, the friction fit has significant advantages in ease of manufacture since a worker can simply wedge a suitably shaped septum into a cavity 14 through the open bottom 26. This manner of assembly is especially convenient since the cavity walls preferably have a slight inward sloping taper toward the wall 18 that is conducive to the wedge insertion of a correspondingly sloped septum.

The effect of the septum and its differential transmission characteristics on the sound absorption characteristics of the Helmholtz resonator is to create a secondary absorption peak at a frequency above the natural, or fundamental, frequency of the resonator. The fundamental resonance occurs in the low frequency range associated with sound energy that is transmitted by the septum and absorbed in the entire volume of the cavity 14. In effect, the low frequency sound does not "see" the barrier and establishes a resonance that is inversely proportional to the square root of the entire volume of the cavity 14. In contrast, the high frequencies "see" the barrier as a wall of the cavity, and establish a resonance at a frequency that is inversely proportional to the square root of only the front volume 14a. This high frequency resonance creates the secondary absorption peak.

Figure 3:
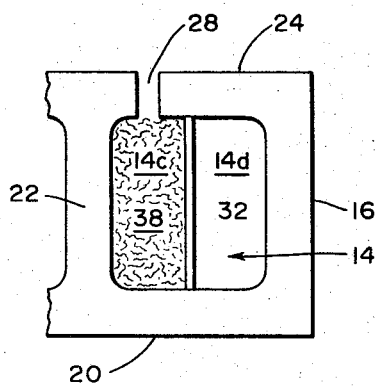
FIG. 3 is a bottom view of another masonry block embodying a second embodiment of the invention.
Figure 4:
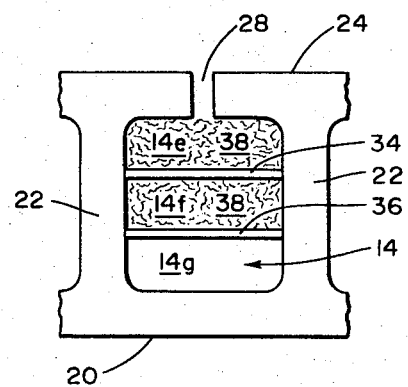
FIG. 4 is a bottom view of a third embodiment of the invention utilizing multiple septa.

Since the frequency response of a sound absorbing block with a septum depends on the volumes 14a and 14b defined by the cavity and the septum, it can be seen that the plane of orientation of the septum within the cavity is not material. Therefore, the septum may be oriented parallel to the front wall 24 as shown in FIGS. 1, 2 and 4, or perpendicular thereto as shown in FIG. 3, or in any other plane. In FIG. 3 a septum 32 divides a cavity 14 into volumes or subcavities 14c and 14d, and the volume 14c is effective to create a secondary absorption peak in a manner similar to the volume 14a in FIG. 1. It is essential only that the septum be continuously sealed to the cavity surface to divide it into a "front" and "back" volume, that is, a volume communicating with the slot or aperture and a volume effectively sealed therefrom.

The dependence of the frequency response on the effective cavity volume 14a allows the septum to be precisely located within the cavity to produce a secondary resonance at a preselected frequency. For example, with the "parallel" septum shown in FIG. 1, the cavity volume 14a is directly proportional to the distance L between the mouth of the slot 28 and the septum, as measured on a line normal to the front wall 24. Therefore, the frequency $f_{sec}$ of the secondary absorption peak will be inversely proportional to the square root of the distance L, or, $$f_{sec} \; \alpha \; \frac{1}{\sqrt{L}} \qquad (1)$$

With different geometries corresponding to different septum orientations or shapes, the secondary peak absorption frequency can be expressed as a function of some other locating parameter that is related to the magnitude of the front volume.

The ability to use equation (1), or an equivalent expression, to select the frequency of a secondary absorption peak allows a block to be tailored to attain maximum sound absorption in a specific environment. Another significant advantage is the capability of increasing the Noise Reduction Coefficient (NRC) rating of the block 12. This rating is used (NRC) the Acoustical and Insulation Materials Association to evaluate by absorbing materials. It is computed by taking the arithmetic average of the statistical absorption coefficients of a material at 250, 500, 1,000, and 2,000 Hz.

Figure 5:
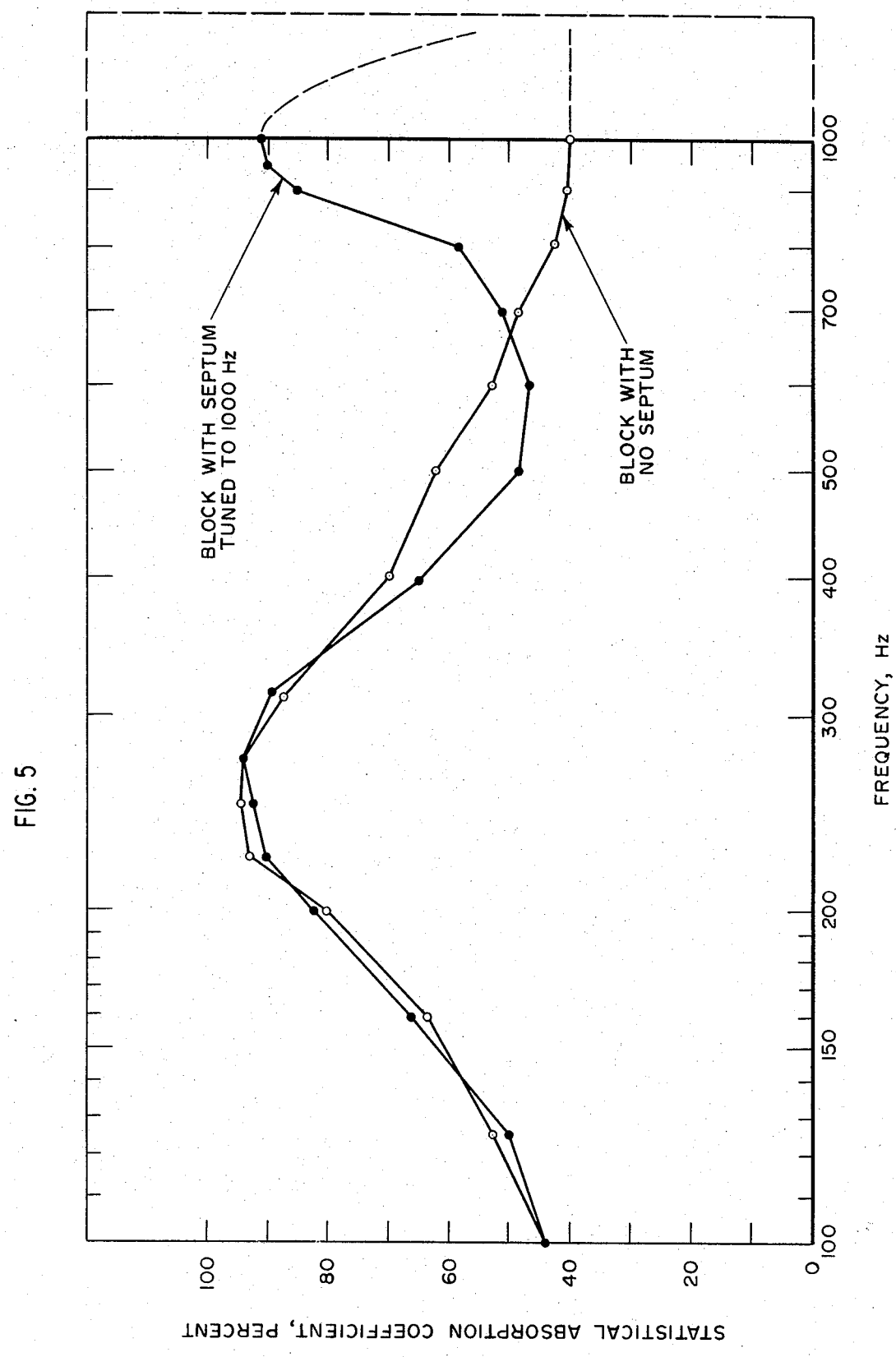
FIG. 5 is a graph showing the measured sound absorption efficiency as a function of the frequency of the impinging sound for a sound absorbing block similar to that shown in FIG. 1 as compared with a conventional sound absorbing block without a septum.

FIG. 5 graphically demonstrates the effect of a septum on the absorption efficiency of a block 12. The vertical axis in FIG. 5 is the statistical absorption coefficient which represents the percentage of the incident sound energy that is absorbed. The term "statistical" means that the absorption coefficient values are adjusted to account for variations in the angle of incidence of the sounds which occur in normal usage. The horizontal axis represents the frequency of the impinging sound. The plotted points were determined experimentally using an 8-inch, three cavity block of the type shown in FIG. 1, wherein the dimension L was the same in each cavity 14. The slot width was ¾ inch and each septum was a sheet of 5 mil aluminum foil laminated to 1 and ⅛ inches of fiberglass having medium diameter fibers and a density of 1 ½ pounds per cubic foot. The septa locations were selected in accordance with equation (1) for a secondary absorption peak at 1,000 Hz. The tests were conducted in an impedance tube which tends to create a sharper peak than reverberation room tests, but at essentially the same peak frequency. The graphs clearly indicate that the presence of the septa creates a secondary absorption peak at approximately 1,000 Hz (the dashed portions of the graphs indicating anticipated behavior). This secondary peak does not occur for an identical block without the septa. It should also be noted that the presence of a septum does not materially reduce the sound absorption effectiveness of the block at the fundamental frequency near 250 Hz.

Another feature of this invention is the use of multiple septa in a single cavity to create a corresponding number of secondary absorption peaks at different frequencies. A cavity with two septa is shown in FIG. 4. A front septum 34 is selected to reflect a certain range of high frequency sound that is higher than the frequency range reflected by an adjacent rear septum 36 located directly "behind" it, that is, on the opposite side of the septum 34 from the aperture 28. In other words, the septa create volumes 14e, 14f and 14g, and are arranged from the aperture 28 to the most removed back volume 14g in a descending order of differential frequency transmission. The secondary absorption peak associated with each septum occurs in the frequency range reflected by that septum but transmitted by a preceding septum or septa. The desired effect has been achieved, for example, with a front septum of 10 to 15 mil pressed asbestos, having a surface density of approximately 0.12 pound per square foot, and a rear septum of 30 mil aluminum having a surface density of 0.4 pound per square foot.

The sound absorbing qualities of the block 12 can be further improved by inserting in a cavity such as 14a (FIG. 1) or 14c (FIG. 3) a fibrous filler material 38 such as fiberglass, rock wool, or a porous foam of elastomeric polymers such as urethane. The filler materials 38 are especially effective in both broadening and heightening all of the absorption peaks. The filler 38 may occupy an entire cavity 14, as shown in the left cavity of FIG. 1, or only a portion of the cavity as shown in FIGS. 2, 3 and 4 and the middle cavity of FIG. 1. It has been determined experimentally that a filler material in the rearmost back volume such as 14b (FIG. 1) or 14g (FIG. 4) may be omitted without any substantial reduction in the sound absorbing effectiveness of the block 12. It has also been determined that for resonances at 250 Hz or less a filler material 38 with a flow resistance (ratio of pressure difference on opposite sides of a sample to air velocity through the sample) of 10,000 mks rayls per meter ($\pm 50$ percent) should have a thickness of at least 1 inch. Preferably each septum is laminated to a piece of the filler material 38 that faces the aperture 28 and has a thickness of at least 1 inch. This arrangement provides the desired enhanced sound absorbing characteristics while providing a mechanical support for the septum. It is also recommended that the filler material not extend into the slots 28 since this results in a significant impairment of the effectiveness of the resonator.

Other variations within the scope of this invention include blocks having one or two cavities, or more than three cavities, as well as blocks of varying dimensions and cavity sizes and shapes. These and still other modifications will become apparent to those skilled in the art from the foregoing description and accompanying drawings. Such modifications are intended to fall within the scope of the appended claims.

What is claimed is:

1. In a block of molded structural material having a cavity and an aperture communicating between the cavity and a source of sound energy, said cavity and aperture forming an acoustical Helmholtz resonator, and said block absorbing the sound energy about a natural resonance frequency in a low frequency range, means for enhancing the sound energy absorption of the block about a secondary resonance frequency in a high frequency range in excess of the low frequency range without detracting from the sound energy absorption in the low frequency range comprising, a septum in a continuous, annular fit with the inner surface of the cavity forming a first cavity volume communicating directly with the aperture and a second cavity volume sealed from the aperture, said septum so structured that it is substantially permeable to sound energy in the low frequency range and substantially impermeable to sound energy in the high frequency range, said second resonance being a function of the first volume.

2. Sound energy absorbing means according to claim 1 wherein said septum is a substantially flat stiff, nonporous sheet.

3. Sound energy absorbing means according to claim 2 wherein said septum is oriented substantially perpendicular to the direction of the impinging sound energy.

4. Sound energy absorbing means according to claim 1 further characterized by a fibrous filler material disposed in the cavity.

5. Sound energy absorbing means according to claim 4 wherein said filler material is contiguous to at least one surface of said septum.

6. Sound energy absorbing means according to claim 5 wherein said filler is laminated to said septum.

7. Sound energy absorbing means according to claim 3 wherein the distance L between the aperture and said septum is selected to produce the secondary resonance at a selected frequency in the mid to high frequency range.

8. Sound energy absorbing means according to claim 1 further characterized by a plurality of said septum located in the cavity to produce a like plurality of said secondary resonances.

9. Sound energy absorbing means according to claim 1 wherein said septum has a surface density of at least 0.05 pounds per square foot.

* * * * *

UNITED STATES PATENT OFFICE
CERTIFICATE OF CORRECTION

PATENT NO. : 3,866,001
DATED : February 11, 1975
INVENTOR(S) : Klaus Kleinschmidt and David Proudfoot It is certified that error appears in the above-identified patent and that said Letters Patent are hereby corrected as shown below:

Column 4, line 60, change "(NCR)" to --by--;

Column 4, line 61, change "by" to --sound--.

Signed and sealed this 20th day of May 1975.

(SEAL)
Attest:

RUTH C. MASON
Attesting Officer

C. MARSHALL DANN
Commissioner of Patents
and Trademarks